L. HARELAND.
WAGON ATTACHMENT.
APPLICATION FILED AUG. 26, 1913.
1,124,019.
Patented Jan. 5, 1915.
2 SHEETS—SHEET 2.
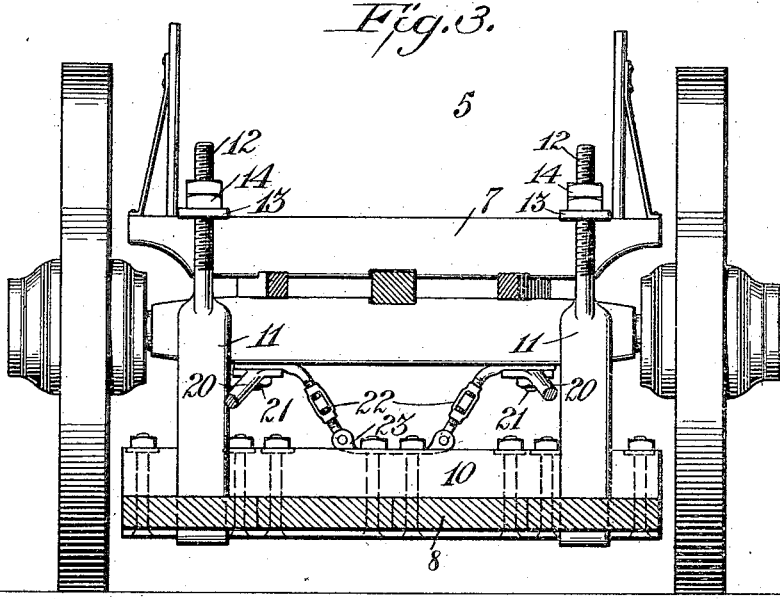
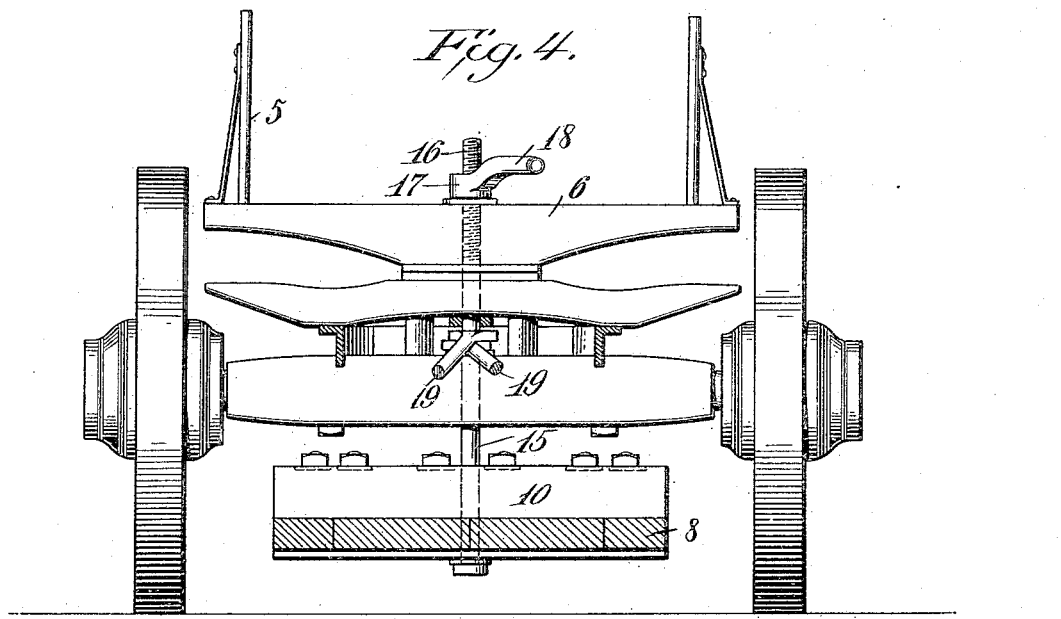
WITNESSES
INVENTOR
Ludvig Hareland
BY
ATTORNEYS

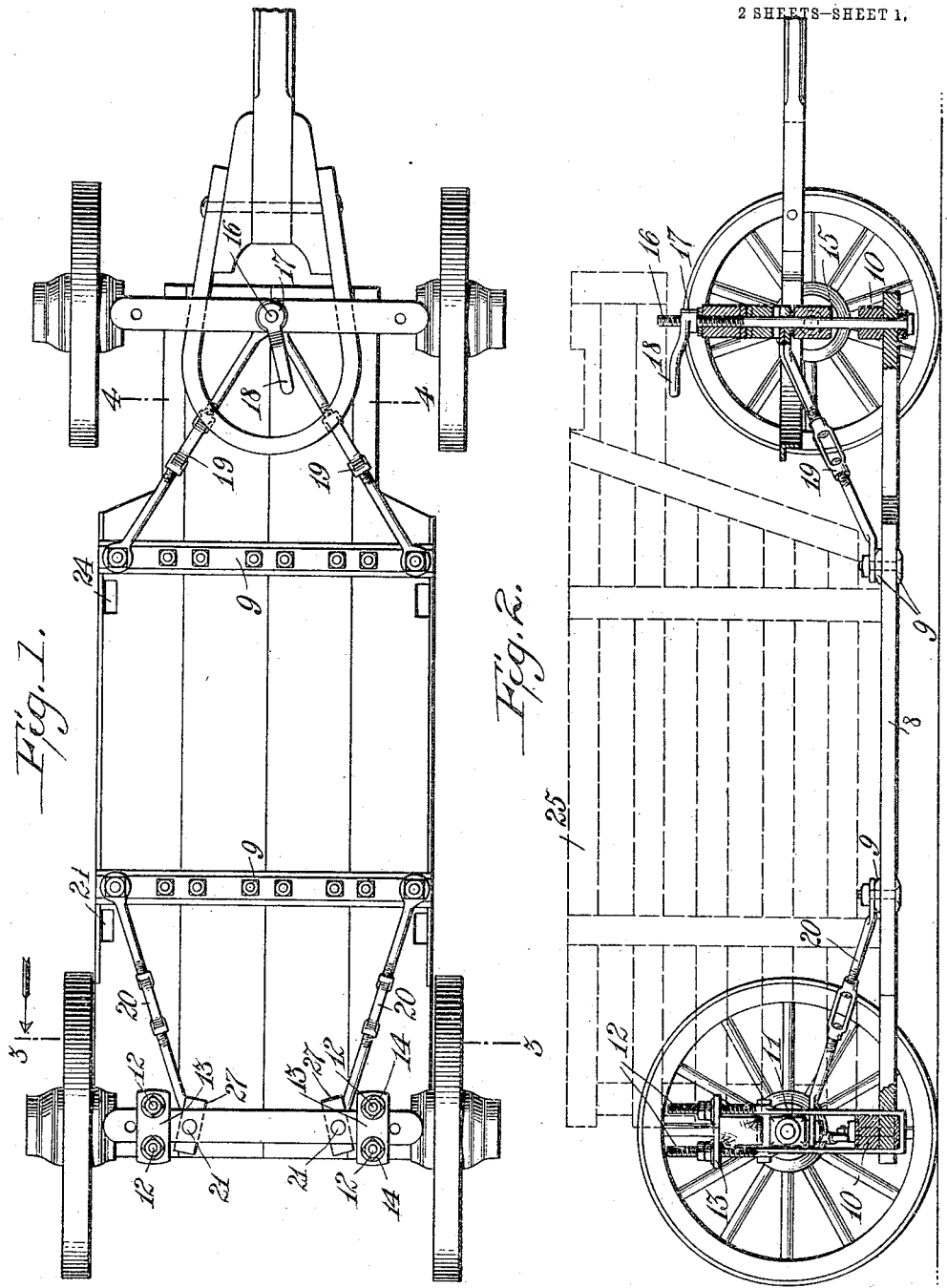

UNITED STATES PATENT OFFICE.

LUDVIG HARELAND, OF HANNAFORD, NORTH DAKOTA.

WAGON ATTACHMENT.

1,124,019.  Specification of Letters Patent.  Patented Jan. 5, 1915.

Application filed August 26, 1913. Serial No. 786,696.

*To all whom it may concern:*

Be it known that I, LUDVIG HARELAND, a citizen of the United States, and a resident of Hannaford, in the county of Griggs and State of North Dakota, have invented a new and Improved Wagon Attachment, of which the following is a full, clear, and exact description.

The object of the invention is to provide a platform for hauling materials requiring a very low wagon, which platform can be attached to any standard make of wagon and can be easily attached to or detached from a wagon.

A further object of the invention is to provide a platform which is adjustable with reference to the wagon.

These objects are obtained by providing a platform having adjustable suspension means adapted to engage the wagon bolsters.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a plan view of an embodiment of my invention as attached to the bolsters of a wagon, the wagon body being removed so that the platform can be used for the transportation of cattle; Fig. 2 is a side elevation showing the sides of the platform in dotted line, when used for the transportation of cattle; Fig. 3 is a section on line 3—3 of Fig. 1, showing the platform attached to the wagon; and Fig. 4 is a similar section to Fig. 3 on line 4—4 of Fig. 1.

Referring to the drawings, particularly Figs. 3 and 4, 5 represents a wagon provided with the customary front and rear bolsters 6 and 7 respectively. Suspended from the bolsters of the wagon 5 is a platform 8 formed of a plurality of longitudinal members bound together by transverse bars 9 and 10. The front end of the platform 8 is reduced in width so as to permit the turning of the front wheels of the wagon. The rear end of the platform is suspended from the rear bolsters by means of U-shaped brackets 11, the threaded ends 12 of which project above the upper bar of the bolsters and receive a plate 13 and nuts 14. By means of these plates and screws this end of the platform can be adjusted vertically with respect to the wagon. The front end of the platform 8 carries a central bolt 15 which passes through the king-bolt aperture in the bolster, so that the bolt 15 serves as a king bolt for the front bolster and, similarly, a support for the front end of the platform. The threaded end 16 of the bolt 15 projects above the upper bar of the front bolster and thereon receives a nut 17 provided preferably with a handle 18 integral therewith and whereby the front end of the platform can be adjusted vertically with respect to the wagon body. In view of the fact that the front axle is in alinement with the bolster, the bolt 15 passes through the same.

Engaging with one end the bolt 15, intermediate the bolster and the axle, is a pair of turn buckles 19, the opposite ends of which are attached to the bar 9. Another pair of turn buckles 20 is similarly attached to the cross bar 9 positioned adjacent the rear of the platform with the other ends of said turn buckles engaging the ends of the bolts 21 connecting the reach hounds with the rear bolster. Another pair of turn buckles 22, disposed transversely of the platform, engages the bolts 21 with one end and a bracket 23 with the other end, the bracket being secured to the rear transverse bar 10. These turn buckles 19, 20 and 22 are adjusted when the platform 8 is lowered or raised by means of the bolt 15 and the U-shaped brackets 11.

When the platform is attached to a wagon as described, the loading of the platform is accomplished from the sides of the same. When it is desired to use the platform for the transportation of cattle (see Figs. 1 and 2), the wagon body 25 is removed from the bolsters. The reach hounds are also removed and in place of the same blocks 27 are interposed. The platform near the sides is provided with openings 24 which can be engaged by side walls 25, as shown in dotted line Fig. 2, and end walls, not shown in the drawing, adapted to engage the side walls, the side and end walls forming guards for the cattle positioned on the platform 8.

As seen from the description, the platform 8 can be easily attached to any standard make of wagon by removing the king bolt of the wagon and causing the bolt 15 to engage the aperture for the king bolt and attaching the brackets 11 carrying the rear of the platform to the rear bolster of the wagon, the turn buckles 19, 20 and 22 being attached to bolts 15 and 21 respectively as described. The platform is adjusted vertically with reference to the wagon body by means of the nuts 12 and 17 respectively; and is prevented from longitudinal motion during the movement of the vehicle by the turn buckles 19 and 20, and from the side motion in the rear by the turn buckles 22. Furthermore, turn buckles 19, 20 and 22 help to distribute the load over the platform more uniformly.

Having thus described my invention, I claim as new and desire to secure by Letters Patent:

1. The combination of a wagon with a platform; a central bolt carrying the front of said platform and engaging the front bolster of the wagon; a nut on said bolt for adjusting vertically the front end of the platform with reference to the bolster; brackets carrying the rear end of the platform and engaging the lateral bolster of the wagon; means on said brackets for adjusting vertically the platform with reference to the rear bolster; and adjustable means connecting said platform to the front and rear bolsters whereby said platform is prevented from lateral movement.

2. The combination of a wagon with a platform positioned under the wagon body and between the wheels of the same; a bolt carrying the front end of the platform and engaging the front bolster of the wagon; means on said bolt for adjusting vertically the said front end of the platform with reference to the bolster; U-shaped brackets carrying the rear end of the platform and engaging the rear bolster of the wagon; means on said brackets whereby the rear end of the platform can be adjusted vertically with respect to the said bolster; and turn buckles connecting said platform to the front and rear bolsters whereby said platform is prevented from lateral displacement.

In testimony whereof I have signed my name to this specification in the presence of two subscribing witnesses.

LUDVIG HARELAND.

Witnesses:
O. E. THORESON,
CORA L. BERG.

Copies of this patent may be obtained for five cents each, by addressing the "Commissioner of Patents, Washington, D. C."